United States Patent [19]
Iwasaki

[11] Patent Number: 5,963,252
[45] Date of Patent: Oct. 5, 1999

[54] PHOTOMETRY DEVICE THAT DETECTS AND COMPENSATES FOR AN INVERSION ABNORMALITY

[75] Inventor: Hiroyuki Iwasaki, Yokohama, Japan

[73] Assignee: Nikon Corporation, Tokyo, Japan

[21] Appl. No.: 08/801,300

[22] Filed: Feb. 18, 1997

[30] Foreign Application Priority Data

Mar. 25, 1996 [JP] Japan .................................. 8-067922

[51] Int. Cl.⁶ .......................... H04N 3/14; H04N 5/335; G03B 7/08
[52] U.S. Cl. ........................................ 348/298; 396/234
[58] Field of Search .................................. 348/298, 229, 348/230, 362, 366, 367, 222, 296, 297; 396/96, 98, 233, 234; 356/218, 222, 215

[56] References Cited

U.S. PATENT DOCUMENTS 4,479,062 10/1984 Kawasaki et al. .
4,544,848 10/1985 Kawasaki et al. .
4,791,446 12/1988 Ishida et al. .............................. 396/96
5,450,163 9/1995 Iwasaki .................................... 396/96

FOREIGN PATENT DOCUMENTS

51-131178 8/1982 Japan .

*Primary Examiner*—Wendy Garber
*Assistant Examiner*—Alicia M. Harrington
*Attorney, Agent, or Firm*—Oliff & Berridge, PLC.

[57] ABSTRACT

A photometric circuit performs photometry on an object field using an accumulating photometric element, such as, for example, a CCD. An accumulation controller controls the photometric circuit. An abnormality sensor determines whether an abnormality, such as, for example, the inversion effect of the photometric output of the photometric circuit has occurred. The accumulation controller sets the accumulation time of the photometric element for the next round of photometry to a minimum value, for example, when it has been determined by the abnormality sensor that an abnormality has occurred. This allows the photometric circuit to return to normal operation as quickly as possible.

24 Claims, 12 Drawing Sheets

PHOTOMETRY DEVICE THAT DETECTS AND COMPENSATES FOR AN INVERSION ABNORMALITY

BACKGROUND OF THE INVENTION

1. Field of the Invention

This invention relates to photometry devices that measure the brightness of an object, and more particularly, to photometry devices suitable for use in automatic exposure control of a camera.

2. Description of Related Art

Figure 13:
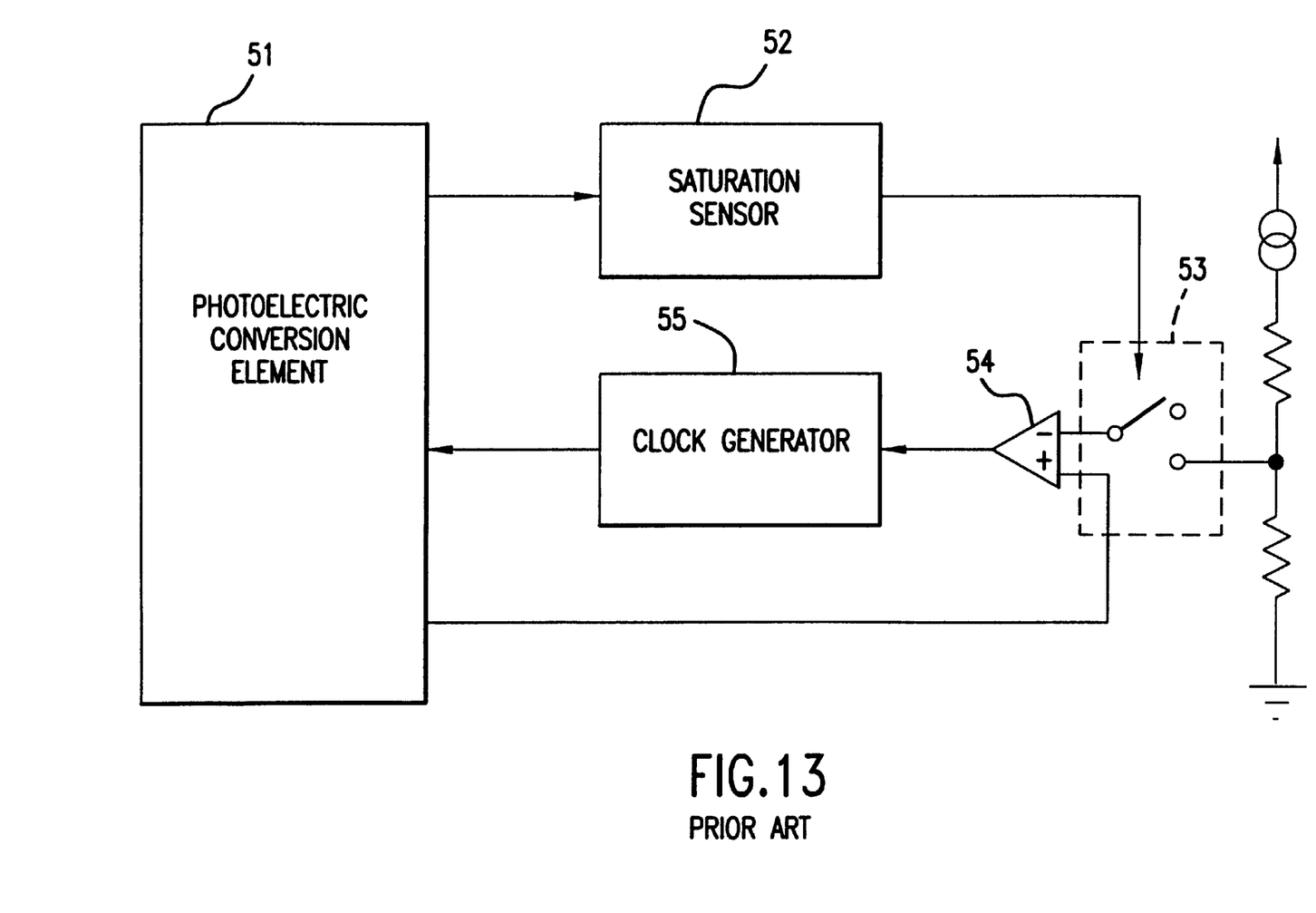
FIG. 13 is a block diagram of a prior art photometric device.

FIG. 13 is a block diagram showing one example of a prior art photometry device (Japanese Laid-Open Patent Application No. 57-131178, which corresponds to U.S. Pat. Nos. 4,479,062 and 4,544,848). A saturation sensor 52 senses whether the output of a photometric circuit (which includes a photoelectric conversion element 51) is saturated. When saturated, sensor 52 switches a switch 53, which reverses the output of a comparator 54. This causes a clock generator 55 to generate clock pulses such that the accumulation time of the photoelectric conversion element 51 is shortened.

The photometry device described above detects whether the output of the photoelectric conversion element 51 is saturated using the saturation sensor 52. However, the saturation sensor 52 cannot determine whether the output is normal or abnormal. For example, depending upon the construction of the photoelectric conversion element, when 100 (or more) times the allowable amount of light enters the photoelectric conversion element, the output passes through a state of saturation and then begins to decrease, resulting in the so-called inversion effect. When this inversion effect occurs, because the output value becomes less than in the state of saturation, the photoelectric conversion element 51 continues to output erroneous photometric information without the saturation sensor 52 being able to sense the abnormality of the output.

SUMMARY OF THE INVENTION

Embodiments of the invention aim to provide a photometry device that can determine whether the output from a photometric circuit is normal or abnormal, and can return the photometric circuit to a normal output by performing a specified processing upon detection of the abnormality.

In order to achieve the above and other objects, embodiments of the invention include a photometric circuit that performs photometry on an object field using an accumulating photometric element, e.g., a CCD. A controller controls the photometric circuit, and an output determination circuit (i.e., an abnormality sensor) determines whether the output of the photometric circuit is normal or abnormal. In particular, when the abnormality sensor determines that the output of the photometric circuit is abnormal, the controller performs specified processing that differs from the processing used for normal operation of the photometric circuit.

In a preferred embodiment, the abnormality sensor determines whether inversion of the photometric circuit output has occurred.

In one example, the controller sets the accumulation time of the photometric element for use during the next round of photometry to a fixed value when the output of the photometric circuit is determined to be abnormal. This fixed value can be a minimum value, i.e., the shortest possible accumulation time that can be used with the photometric element.

Additionally, when the photometric circuit has an output gain switching function (i.e., the gain of the photometric circuit can be switched), the controller sets the output gain to low gain when the output of the photometric circuit is determined to be abnormal.

When the photometric element has a light-blocked pixel output, in which one or more of the photoelectric converters of the photometric element are optically blocked from receiving light (so that they generate a so-called dark current) the abnormality sensor determines whether the output is normal or abnormal based on the value of the light-blocked pixel output. For example, the abnormality sensor can determine whether the output is normal or abnormal based on comparing the light-blocked pixel output to a reference output that has a fixed output value that is not dependent on the accumulation time. The value of the photometric output also can be used in the determination.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
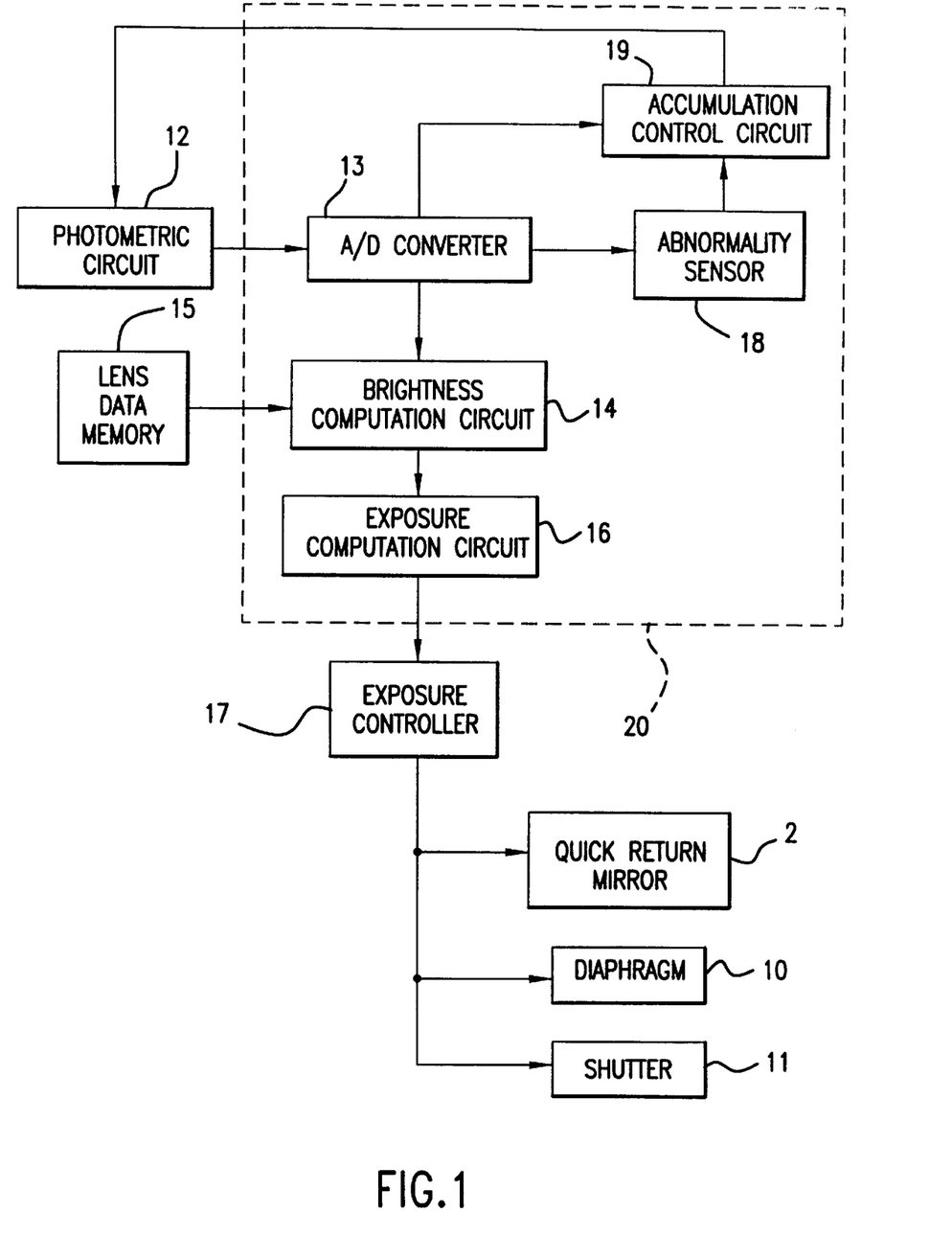
FIG. 1 is a block diagram of a photometric device according to a preferred embodiment of the present invention.

Photometric circuit 12 is a circuit that performs photometry on an object field using an accumulating photometric element 9, which can be, for example, a CCD. Photometric circuit 12 outputs photometric data to a brightness computation circuit 14, an abnormality sensor 18, and an accumulation control circuit 19 after the photometric data is converted to numeric values by an A/D converter 13.

The abnormality sensor 18 determines, based on the most recent photometric data, whether the so-called abnormal saturation has occurred, which causes an inversion effect on the photometric circuit 12. The output of abnormality sensor 18 is input into the accumulation control circuit 19. One method of determining whether abnormal saturation has occurred is explained in more detail below, for example, with reference to FIG. 8. The accumulation control circuit 19 determines the accumulation time and photometric circuit gain that is to be used for the next round of photometry based on information provided by the A/D converter 13 and by the abnormality sensor 18, and controls the photometric circuit 12 based on these determinations. One method of determining the accumulation time and photometric circuit gain for the next round of photometry is explained in more detail below, for example, with reference to FIGS. 9, 11 and 12.

The brightness computation circuit 14 computes the absolute brightness value of the object field based on the output from the A/D converter 13 and on data stored in a lens data memory 15, which stores data concerning the attached lens. The output of brightness computation circuit 14 is input into an exposure computation circuit 16. The exposure computation circuit 16 computes the appropriate exposure values based on data from the brightness computation circuit 14 according to any number of techniques. The output of exposure computation circuit 16 is provided to an exposure controller 17. The exposure controller 17 senses the full depression of a release button (not shown), and then drives a quick return mirror 2, a diaphragm 10, and a shutter 11 based on the appropriate exposure value set by the exposure computation circuit 16, so as to perform exposure of the film.

In the preferred embodiment, the A/D converter 13, the brightness computation circuit 14, the exposure computation circuit 16, and the abnormality sensor 18 are all implemented using a microprocessor (henceforth, microcomputer) 20. The processing performed by the microcomputer 20 is explained in more detail below. It is, however, within the scope of the invention to perform the functions of these components by other means. For example, the invention can be implemented using a plurality of separate dedicated or programmable integrated or other electronic circuits or devices (e.g., hardwired electronic or logic circuits such as discrete element circuits, or programmable logic devices such as PLDs, PLAs, PALS, or the like). A suitable programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used as a controller with the invention.

Figure 2:
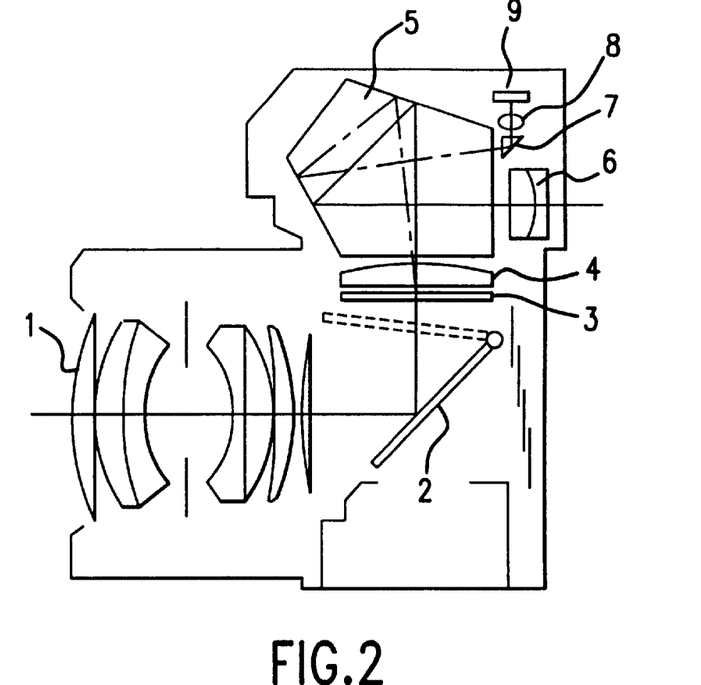
FIG. 2 is a side schematic view of an optical system of a camera according to the preferred embodiment.

FIG. 2 is a block diagram of the optical system of a camera according to the preferred embodiment. After the luminous flux has passed through a photographic lens 1, it reaches the eye of the photographer after reflecting from a quick-return mirror 2, and passing through a diffusion screen 3, a condenser lens 4, a pentaprism 5, and an eyepiece lens 6. Meanwhile, after a portion of the luminous flux has been diffused by the diffusion screen 3, it reaches the photometric element 9 after passing through the condenser lens 4, the pentaprism 5, a photometric prism 7, and a photometric lens 8.

Figure 3:
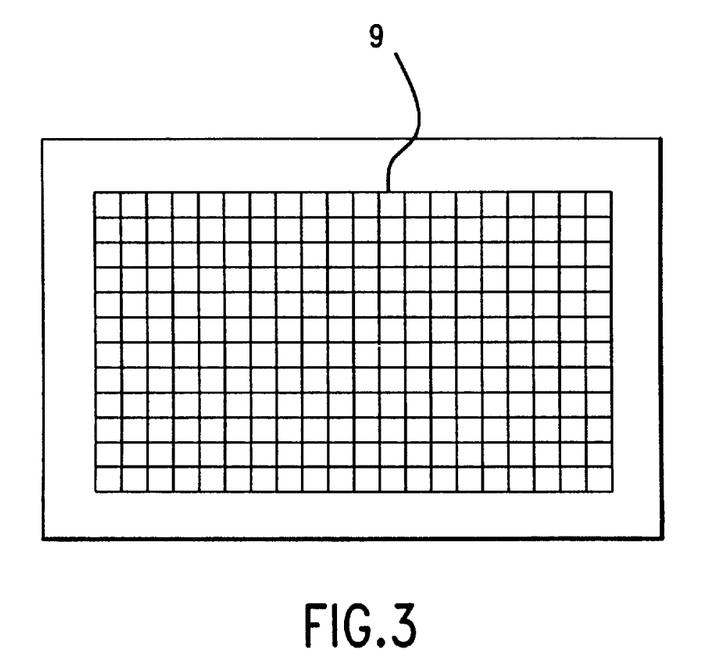
FIG. 3 shows a partitioned photometric element according to the preferred embodiment.

FIG. 3 illustrates the partitioned state of the photometric element 9 mapped onto the object field. The photometric element 9 includes an accumulating sensor such as, for example, a CCD (charge-coupled device), and can perform photometry by partitioning nearly the entire object field. In the present example, the photometric element 9 is vertically partitioned into twelve sections and horizontally partitioned into twenty sections, totaling 240 regions.

Figure 4:
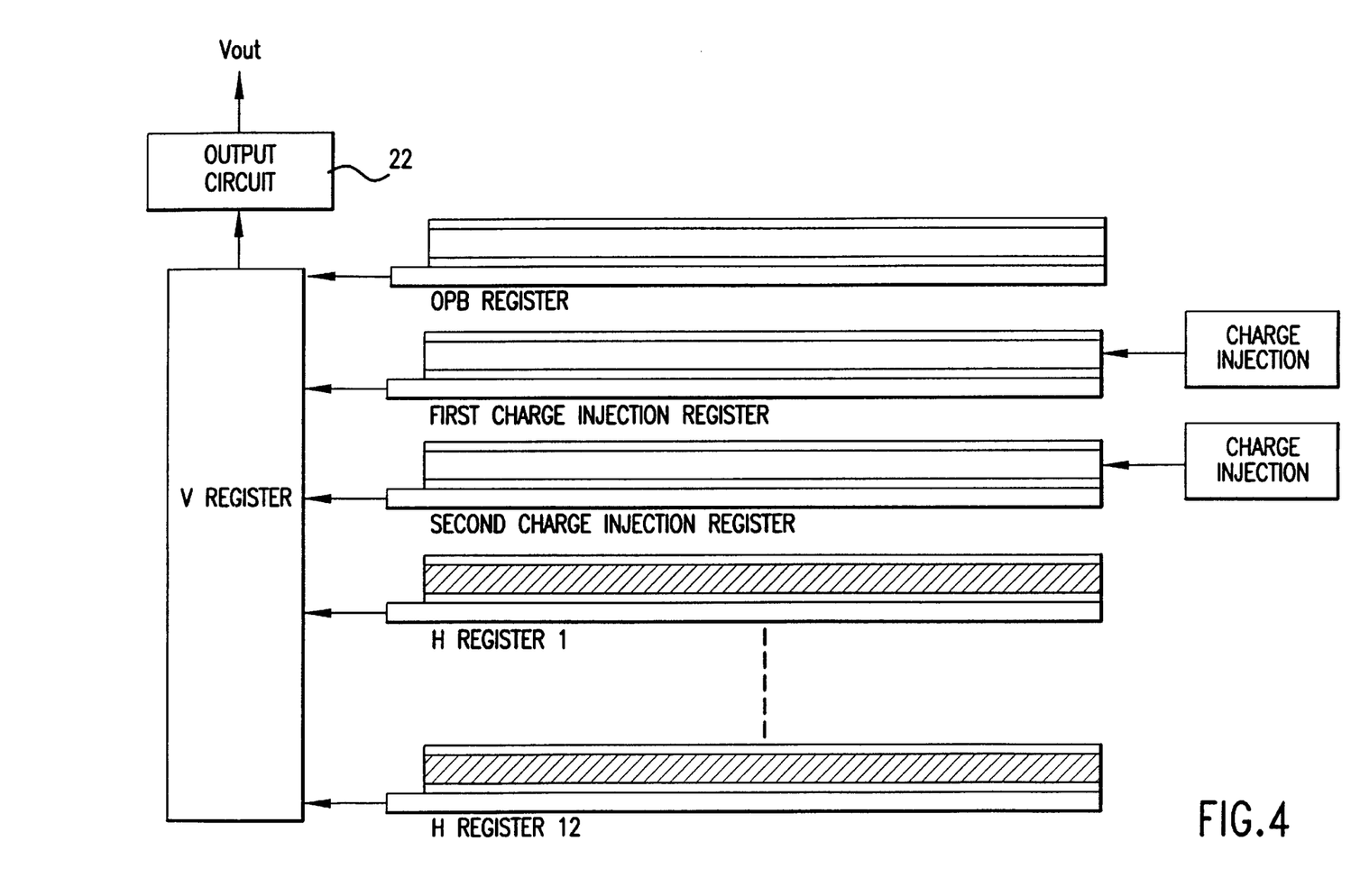
FIG. 4 is a block diagram of a photometric element according to the preferred embodiment.

FIG. 4 is a block diagram representing in more detail the internal construction of the photometric element 9 according to the preferred embodiment. The photometric element 9, which includes an accumulating element such as a CCD, is equipped with three types of registers. The first type of register includes an OPB register, which does not have a light-receiving element. The second type of register includes a first charge injection register and a second charge injection register. The third type of register includes twelve H (horizontal) registers that have light-receiving elements so as to perform photometry on the object field. Twenty independent pixel signal outputs are connected to each of the registers mentioned above. The photometric outputs, etc., pass via these registers through a V (vertical) register that is placed at a 90° angle relative to the H register, and are output to an output circuit 22.

After the output circuit 22 has converted the output from the V register into a voltage, it magnifies the signal by, e.g., 1 (during L gain) or by, e.g., 4 (during H gain), and outputs a signal having a constant timing to the output terminal. The gain of the output circuit 22 can be switched by the microcomputer 20.

The OPB register has a photoelectric conversion element that is blocked optically. That is, the photoelectric conversion element of the OPB register does not receive light. Thus, the photoelectric conversion element of the OPB register outputs only the dark current that is generated during accumulation of the photometric element 9. This information commonly is used to compensate for the dark current characteristics of the photoelectric conversion elements. The output of the first and second charge injection registers is used mainly when performing compensation on the output of the photometric element 9. The first and second charge injection registers always output a fixed charge regardless of the brightness of the object field. An explanation of the method of output compensation is omitted since it is not directly related to the present invention. The first and second charge injection registers have differing amounts of injected charge.

Figure 5:
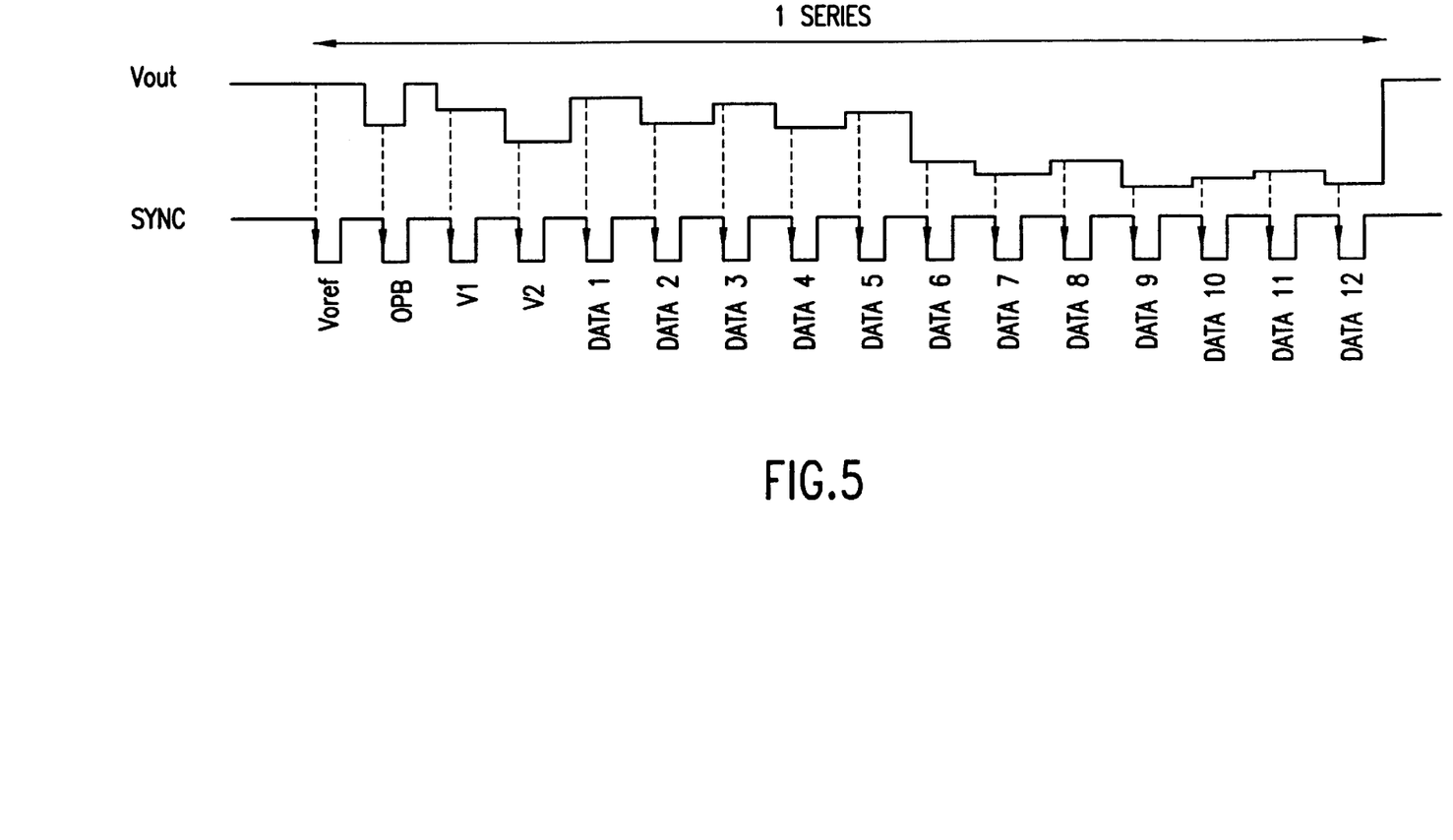
FIG. 5 shows the photometric output of the photometric element according to the preferred embodiment.

FIG. 5 illustrates the signals output from the photometric element 9 of the preferred embodiment. The output of the photometric element 9 is obtained by reading in the Vout signal, which is synchronized with the trailing edge of a timing signal (SYNC). The first three pulses are so-called dummy output that does not include information from the photometric circuit 12, and this voltage level Voref (about 4V) becomes the reference level of the photometric element 9. Following Voref is the OPB output Vopb, the first and second injection charges V1 and V2, and the outputs Vo[x] (x=1~12) of registers H1~H12. These signals are output for each pixel as a difference from the reference level Voref. This comprises one series of signals for use by the V register. The signal component of each output is output in the 0V direction with the reference level being set to 0. A full signal component is set by subtracting its pixel signal levels from the reference level. For example, when the reference level= 4V and the signal output level=3V, the pixel signal component is 1V. One screen of output (i.e., information for one screen of light data—a screen being shown in FIG. 3) is completed by repeating this process for 20 series (in this example where the CCD includes a matrix of 12×20 light-receiving components).

FIGS. 6A–6E show the light intensity and wave forms output from the photometric element 9. FIG. 7 shows the relationship between the photometric output and the dynamic range of the photometric element 9.

Figure 6A:
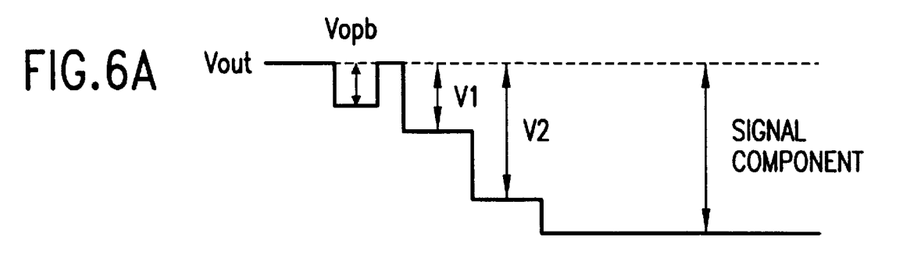
FIGS. 6A–6E show the output states of the photometric element at different levels of saturation according to t preferred embodiment.
Figure 7:
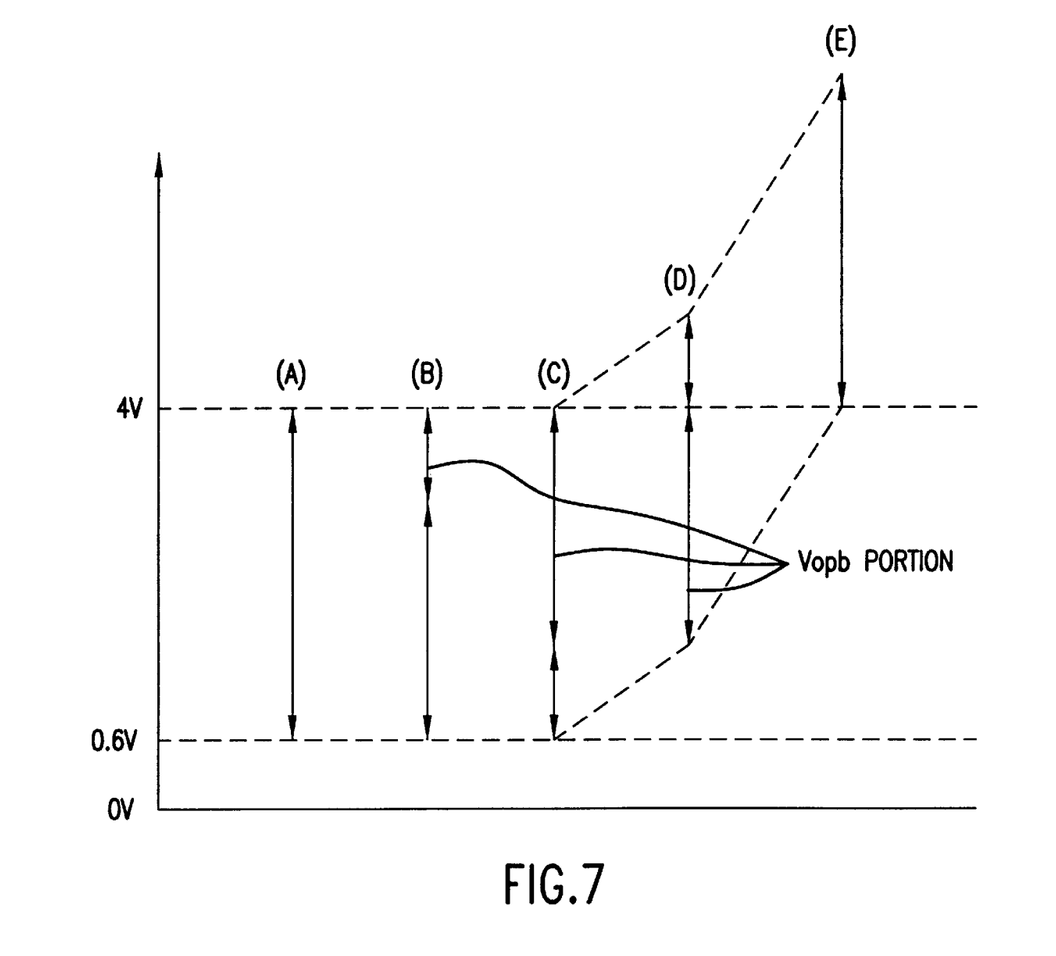
FIG. 7 illustrates the relationship between the photometric output and the dynamic range of the photometric element according to the preferred embodiment.

FIG. 6A shows the state in which the light intensity is weak and the output is not saturated. In this case, the dynamic range of the output, as shown at (B) of FIG. 7, enters the state in which only the Vopb portion of the dark current output is subtracted from the total dynamic range (the total dynamic range being shown at (A) of FIG. 7).

Figure 6B:
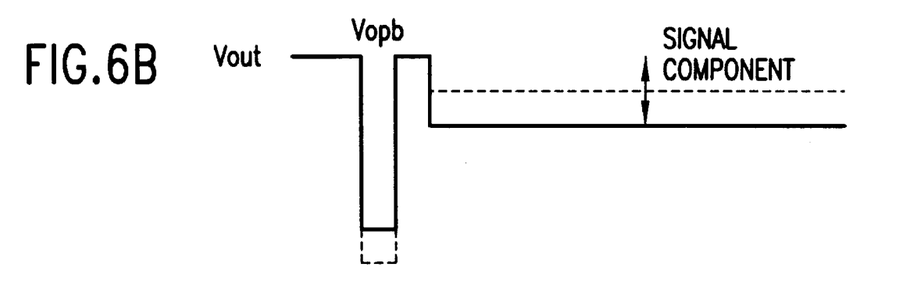

When the light intensity increases, as shown in FIG. 6B, the value of Vopb becomes greater due to the transmission of charge to the light-blocked pixels. This causes the signal component to become smaller as shown at (C) of FIG. 7. From this state, the charge transmission to the light-blocked pixels becomes even greater as the accumulation time is lengthened, and the usable photometric output becomes smaller as shown by the dotted lines due to the value of Vopb becoming greater. This is known as the inversion effect.

When this inversion effect has occurred, because the output becomes smaller as the accumulation time is lengthened, a proportional relationship (between Vopb and the signal component) is not maintained as is the case for the usual accumulation time and output. In this case, if the usual control of the accumulation time is performed, the accumulation time is extended more and more in an (unsuccessful) attempt to increase the output, until, ultimately, the maximum accumulation time is reached.

Figure 6C:
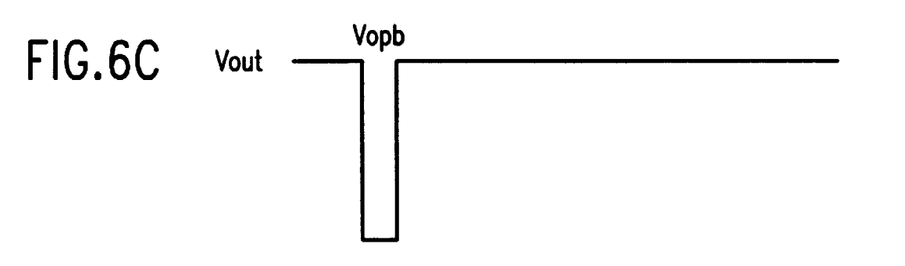
Figure 6D:
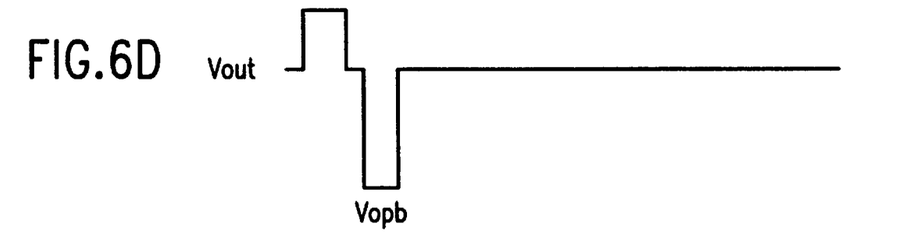

When the light intensity is further increased from that shown in FIG. 6B, the entire dynamic range of the output ends up being taken to Vopb, and the usual photometric output becomes impossible to output, as shown in FIG. 6C. At this time, the output is saturated in spite of the photometric output being 0. This is called a state of abnormal saturation. Also, when the light becomes even stronger, the voltage rises even when the output is clipped to Voref and, as shown in FIG. 6D, the voltage immediately before the value of the Vopb output becomes Voref or higher. In compensation, the value of the Vopb output becomes smaller than during (C) as shown at (D) of FIG. 7.

Figure 6E:
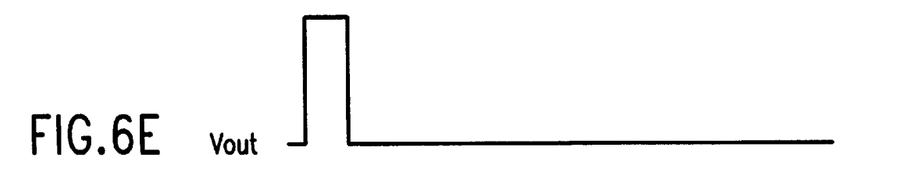

As the light intensity becomes even stronger, finally, even the Vopb output becomes 0 as shown in FIG. 6E. This state is shown as (E) in FIG. 7. In this manner, because there are various stages of output abnormalities, it is difficult to determine the state only by looking at the size of Vopb. For example, in both FIG. 6A and FIG. 6D, because the value of the Vopb output itself is smaller than the size of the dynamic range shown as (A) in FIG. 7, it is impossible to determine whether the output is normal or abnormal.

In fact, when Vopb increases up to the vicinity of the dynamic range, as shown in FIG. 6C, because the dynamic range of the usual photometric output becomes extremely small, it is estimated that it will be difficult to obtain an effective photometric output. Also, as shown in FIG. 6E, when in the completely saturated state, discrimination is impossible because the V1 and V2 outputs become 0 and are not output, as compared to the state of FIG. 6A.

In order to avoid the undesirable situations described above, according to one aspect of the invention, the accumulation time and/or gain is controlled in a manner that is different from the usual manner of control.

Figure 8:
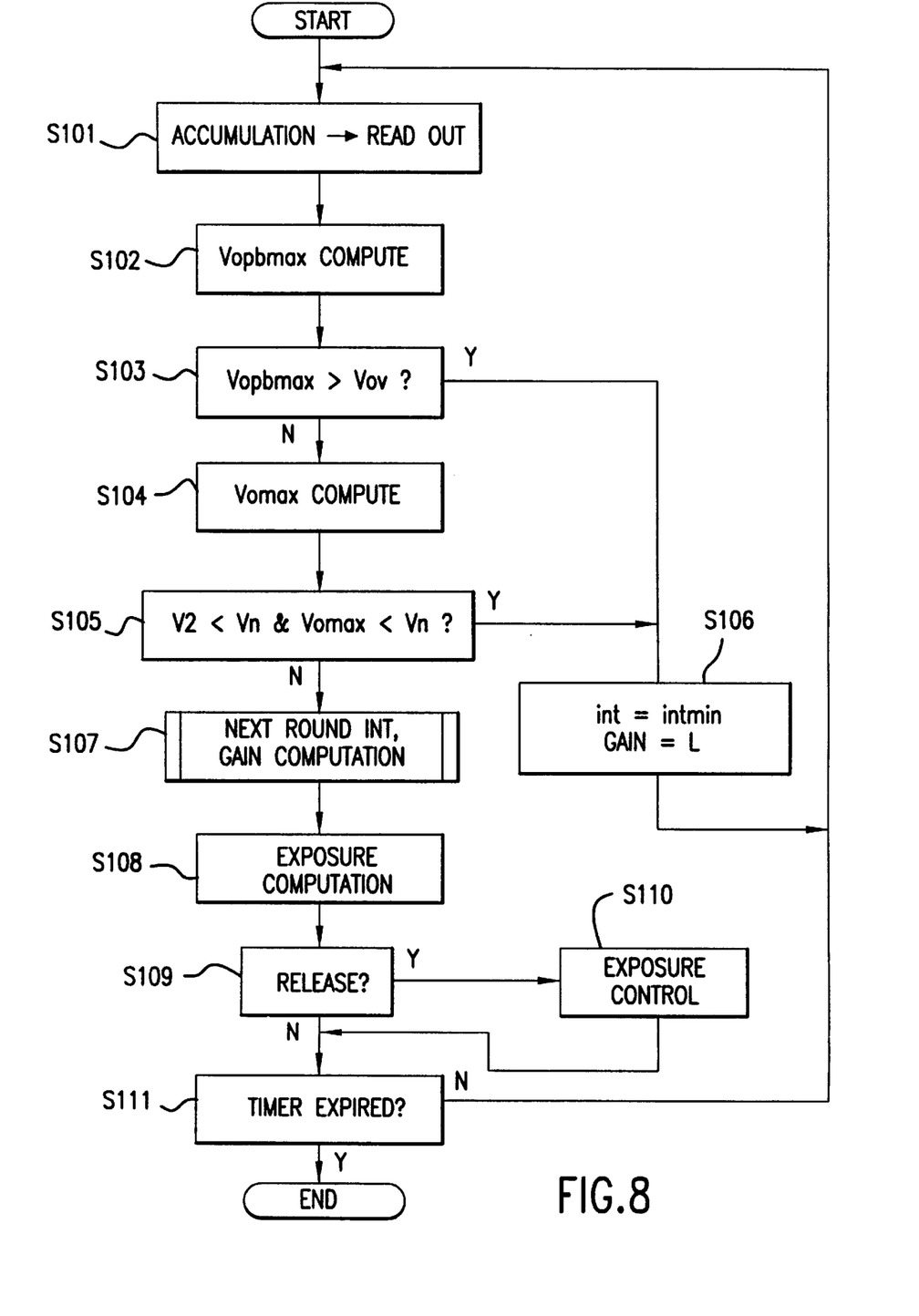
FIG. 8 is a flow chart of a main process used by the photometric device according to the preferred embodiment to determine whether the photometric output is normal or abnormal.

FIG. 8 is a flow chart showing a program performed by the microcomputer 20. When the camera release button (not shown) is half depressed, the camera power supply is switched ON, and the program is executed.

In step S101, accumulation by the photometric element 9 is performed, and the photometric output is read out after completion of the accumulation. The accumulation time and gain used during this accumulation are determined either by the step S107 or by the step S106 performed during the previous round of photometry. Alternatively, when the photometry is the initial photometry performed after the initialization of the power supply, because the steps S107 and S106 have not yet been passed, accumulation is performed using default values, for example, by setting the gain to L and the accumulation time int to 1 mS. In step S102, Vopbmax is computed from the photometric data read out. As shown in FIG. 4, there is one OPB register, and therefore for 1 screen there are 20 values for Vopb. Vopbmax is the maximum value among these 20 values.

Whether Vopbmax is greater than Vov is determined in step S103. Vov represents the overflow voltage of the photometric element 9, and it is the basis of determining whether there is abnormal saturation. Because Vov is set close to the maximum value in which the output of the photometric element 9 is linear, an abnormal situation may exist when the output is at Vov or higher. The base value for Vov is about 3.4V. This is mainly for the purpose of determining the state shown in FIG. 6C. When the dynamic range differs according to whether the gain of the photometric element is set to H or L, it is desirable to prepare multiple values for Vov according to the gain, and to use the Vov value that corresponds to the gain that was used during accumulation.

When Vopbmax>Vov in step S103, it is determined to be an abnormal saturation state, and flow advances to step S106. When the result of step S103 is negative, flow advances to step S104. In step S104 the maximum value Vomax of the 240 photometric outputs is computed.

In step S105, it is determined whether the second injection charge output V2 is less than Vn and whether Vomax is less than Vn. Referring to the prior description of FIG. 4, there are also 20 values of the second injection charge output, but because these are fundamentally equivalent values, an arbitrary V2 value may be selected and used. Alternatively, the average of the 20 V2 values may be taken. As another alternative, the maximum value or the minimum value of the 20 V2 values may be taken. When there is no memory and computation time, the method of taking an arbitrary V2 value is suitable. When stable values are desired, the method of taking the average of the 20 V2 values is suitable. Also, the method of using the maximum value is effective when it is desired to make it less likely that abnormal saturation will be detected. Conversely, the method of using the minimum value is effective when it is desired to make it more likely that abnormal saturation will be detected. Vn is the value of the output noise level of the photometric element 9. Because there may be outputs below the noise level even when there is abnormal saturation, step S105 is effective in preventing such abnormal saturation from being missed. As above, when the noise level differs according to the gain of the photometric element 9, it is desirable to prepare multiple values of Vn according to the different gains and to use the Vn value that corresponds to the gain that was used during accumulation.

When step S105 is affirmative, flow advances to step S106, where processing appropriate for abnormal saturation is performed. That is, the next round accumulation time int is set to int_min and the gain is set to low gain (L) in step S106. Here, int$_{13}$ min is the minimum accumulation time that is able to be set. Thus, when abnormal saturation occurs, the probability of being able to avoid the state of abnormal saturation in the next round of photometry is increased by setting the parameters to be used for the next accumulation such that the output of the photometric element 9 becomes its smallest.

When the result of step S105 is negative, computation of the next round accumulation time is performed assuming a normal state, in step S107. This method is explained in more detail below.

In step S108, the absolute brightness value is computed using the obtained data and the open aperture stop of the attached lens, and the proper exposure for the object field is computed by any commonly known method. In step S109, it is determined whether the release button (not shown) is fully depressed. When fully depressed, in step S110 exposure of the film based on the proper exposure values is performed. Flow then advances to step S111. Flow also advances to step S111 when the release button is not fully depressed. In step S111, it is determined using a half depression timer whether a specified time has elapsed after release of the half depression. If the half depression is continuing or is within the specified time, flow returns to step S101 and the processing is repeated. If the timer has expired, the program ends.

Figure 9:
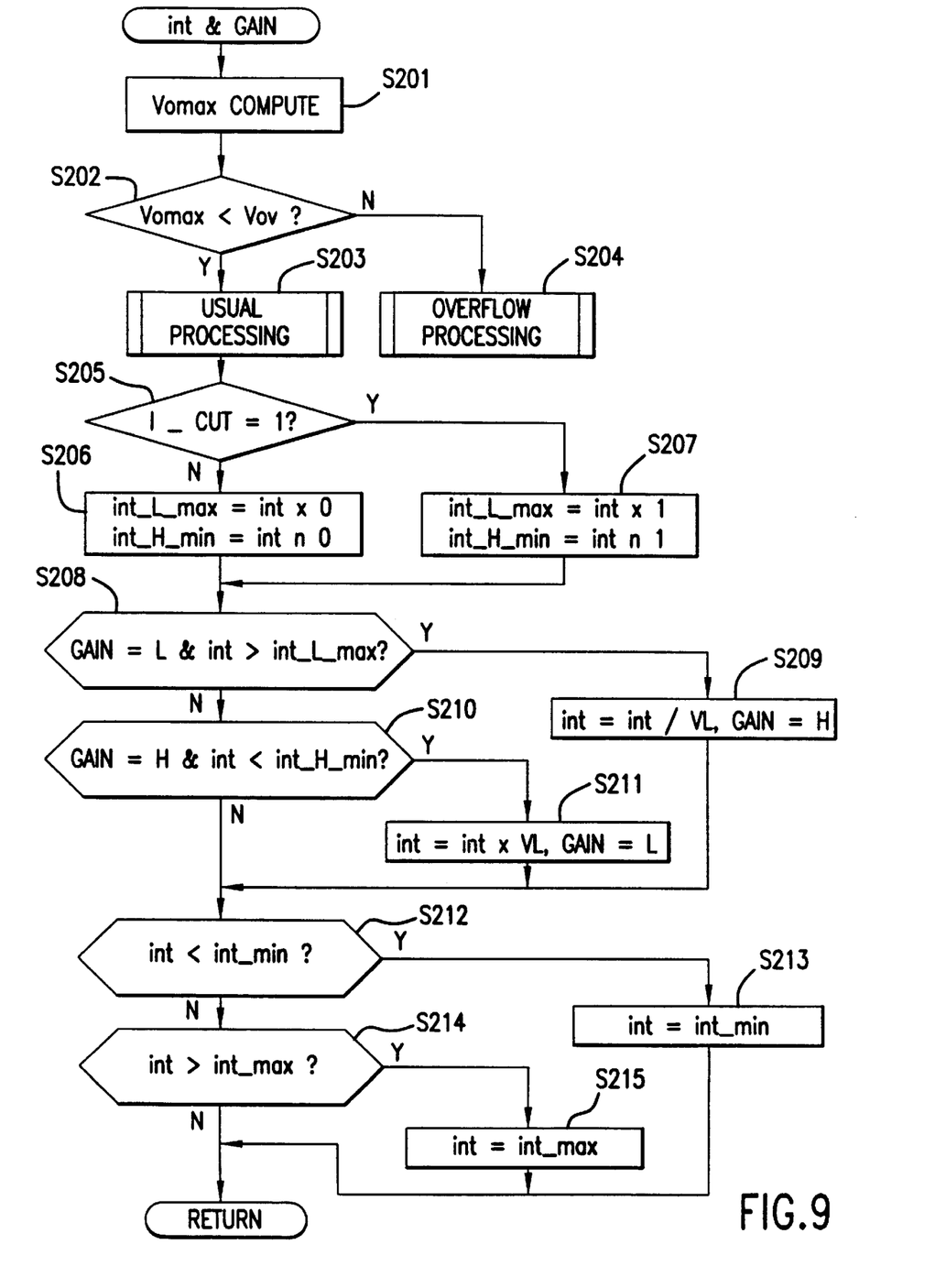
FIG. 9 is a flow chart of a process for setting the gain and accumulation time when no abnormality is detected in the photometric device according to the preferred embodiment.

FIG. 9 is a flow chart of a subroutine that sets the accumulation time int and the amp gain for the next round of photometry. This subroutine is called and executed when step S107 in FIG. 8 is executed. Before this subroutine is called, because at least one round of photometry has been performed after the initialization of the power supply, the immediately preceding photometry data remains in a memory (not shown) inside the microcomputer 20.

In step S201, Vomax is determined in the same manner as in step S104 of FIG. 8. Alternatively, the value of Vomax set in step S104 may be stored in memory and used as is. In step S202, it is determined whether Vomax<Vov, that is, whether the photometric data is in an overflow state. When the photometric data has not overflowed (step S202 is affirmative), flow advances to step S203 and the next round accumulation time is computed by usual processing, which will be explained in more detail below with reference to FIG. 11. If the photometric data has overflowed, flow advances to step S204 and the next round accumulation time is computed by an overflow processing routine, which will be explained in more detail below with reference to FIG. 12.

Next, it is determined in step S205 whether I__CUT=1, that is, whether a photometry prohibiting interrupt signal has occurred, such as occurs if the release operation occurs during photometric accumulation, etc. The release operation occurs, for example, when the photographer presses the release button to the fully depressed position, causing the quick release mirror to move to the up position. When I__CUT=0, that is, when a photometry prohibiting interrupt signal has not occurred, flow advances to step S206, and parameters are set such as shown in equations 1 and 2:

$$\text{int\_L\_max}=\text{intx0} \tag{1}$$

$$\text{int\_H\_min}=\text{intn0} \tag{2}$$

Here, int__L__max and int__H__min are parameters that are used to determine whether to switch the gain of the photometric circuit 10. Specifically, by comparing the length of the next round accumulation time set in step S203 or in step S204 with the two values above (int__L__max and int__H__ min the gain of the photometric circuit 10 may be switched in the next round of photometry to the high gain (H) or to the low gain (L). The specific processing is explained in more detail starting with step S208.

Meanwhile, when I__CUT=1, that is, when a photometry prohibiting interrupt signal has occurred, flow advances to step S207, and parameters are set such as shown in equations 3 and 4:

$$\text{int\_L\_max}=\text{intx1} \tag{3}$$

$$\text{int\_H\_min}=\text{intn1} \tag{4}$$

Thus, different values are assigned to int__L__max and int__H__min based on a determination as to whether an interruption of the accumulation occurred in the previous round of photometry. The significance of these differences will become clear from the following description.

In step S208, it is determined whether the present gain setting of the photometric circuit 10 is L, that is, low gain, and whether the next round accumulation time int is greater than int__L__max. If the result of step S208 is affirmative, that is, the gain is L and the accumulation time is longer than int__L__max, flow advances to step S209. In step S209, the accumulation time for the next round of photometry is set by dividing the present accumulation time int by VL as shown in equation 5, and the gain is switched to H.

$$\text{int}=\text{int}/\text{VL} \tag{5}$$

Figure 10:
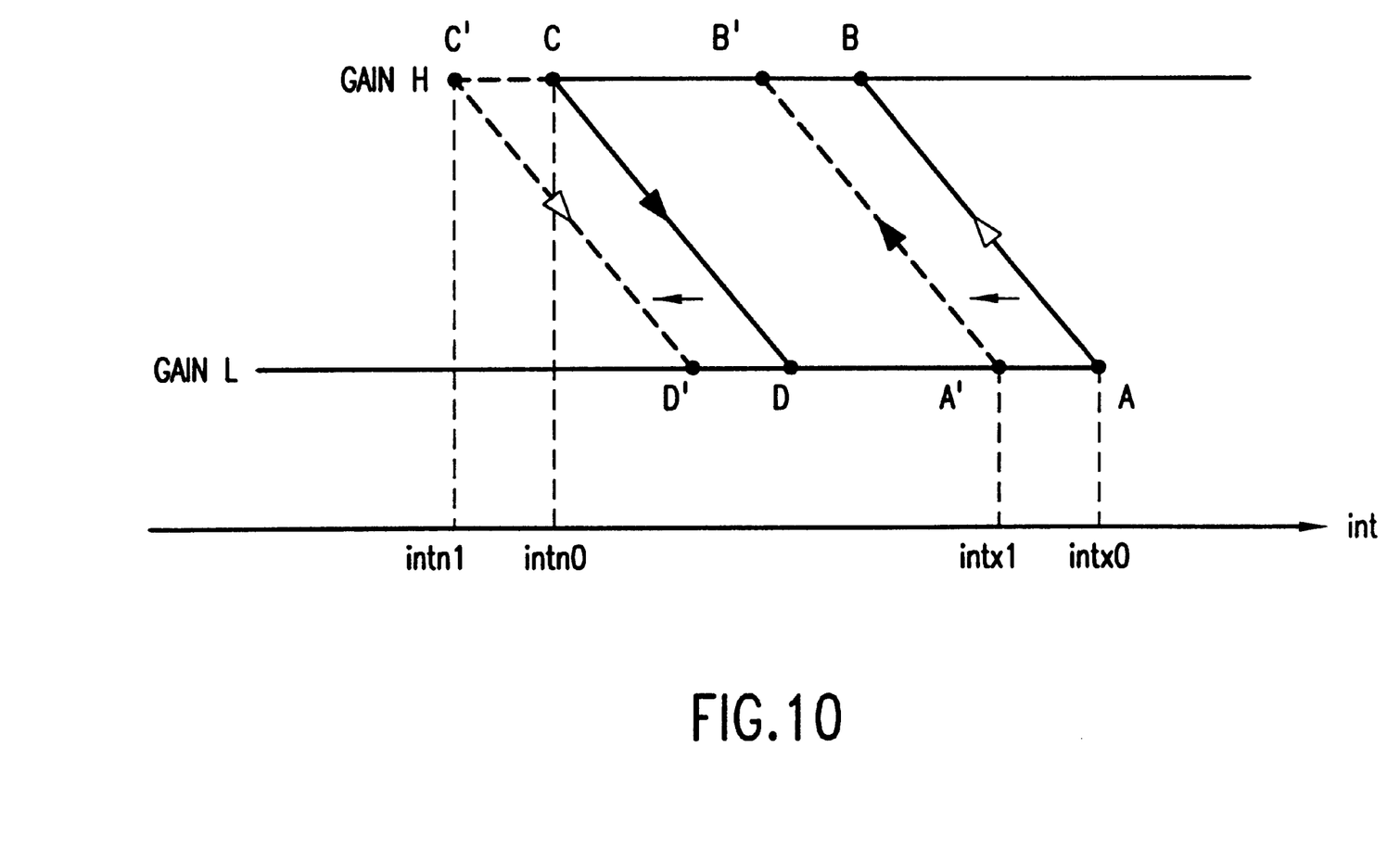
FIG. 10 illustrates changing of the accumulation time and gain according to the preferred embodiment.

Here, VL is the gain constant of the photometric circuit 10. Specifically, VL represents how many times larger the H gain output is relative to the L gain output. FIG. 10 illustrates the processing of this case. The processing of step S209 corresponds to switching from A to B (when I__CUT=0) in FIG. 10, or switching from A' to B' (when I__CUT=1). Referring to FIG. 10, the gain will be switched (from L to H) and the accumulation time (int) will be shortened only when, for an accumulation using a gain of L, the accumulation time has a length of A or greater when there was not an interruption. When, however, an interruption occurred, the gain will be switched (from L to H) and the accumulation time will be shortened when the accumulation time had the shorter duration of A' (or a value greater than A'). Thus, the threshold for switching the gain from L to H and for reducing the accumulation time is lowered when an interruption occurs. This increases the likelihood that the next round of accumulation will take place in a time period that is short enough to avoid the occurrence of an interruption.

When the result of step S208 is negative, it is determined in step S210 whether the present gain setting of the photometric circuit 10 is H, that is, high gain, and whether the next round accumulation time int set in step S203 or in step S204 is smaller than int__H__min. When the result of step S210 is affirmative, that is, when the gain is H gain and the accumulation time is short, flow advances to step S211, where the next round accumulation time int is multiplied by VL as shown in equation 6, and the gain is switched to L.

$$\text{int}=\text{int}\times\text{VL} \tag{6}$$

Also, referring to FIG. 10, the processing of step S211 corresponds to switching from C to D (when I__CUT=0), or switching from C' to D' (when I__CUT=1). In this manner, when the gain is H and int is small, the better signal to noise characteristics of the L gain are utilized by switching the gain to L and making int longer. As can be appreciated from FIG. 10, when the gain is H, the threshold for switching the gain from H to L and for increasing the accumulation time is decreased when an interruption occurs. Thus, lower values of int (the accumulation time) are permitted when interruptions occur, which minimizes the possibility of subsequent interruptions occurring. Also, when switching the gain between H and L, as shown in FIG. 10, due to hysteresis, stable control becomes possible even in spite of photometric scattering and cases when the brightness has varied minutely in the vicinity of the switching points.

Thus, when I_CUT=1, that is, when a photometry prohibiting interrupt has occurred during photometric accumulation, the duration of the next round accumulation time is made shorter than the usual case (when there is no interrupt) by shifting the switching points (i.e., the values of parameters int_L_max and int_H_min in the shorter direction of the accumulation time. This enables the next round of photometry to be performed immediately after the photometric prohibition has been released because when a photometric prohibiting interrupt has occurred, it indicates that the release state of the camera, that is, the exposure state has been entered due to the release button being fully depressed. In particular, when the film supply mode is a high-speed advancing mode, once the first exposure has finished, the mirror has gone down, and the photometric prohibition has been released, a second exposure may begin and another photometric prohibition signal may occur. In order to avoid such an occurrence, the present process makes the time spent in photometry shorter than usual in the first round of photometry that occurs after release of the photometric prohibition signal (i.e., by reducing the accumulation time). From the second round of photometry onward, after release of the photometric prohibition signal, because the newest photometric data already is obtained and the first round (after occurrence of an interruption) has finished (and there very likely was not an interruption of the previous accumulation), the process returns again to the usual state (e.g., using a gain of L), which has a better signal to noise ratio. However, due to hysteresis, for example, it is also likely that the subsequent rounds will use accumulation times that are shorter than the accumulation time that led to a photometry interruption. Accordingly, it is likely that these subsequent rounds will not be interrupted, even though they are performed at a gain of L.

Next, in step S212, the determination of equation 7 is performed.

$$int < int\_min \quad (7)$$

Here, int_min is the minimum accumulation time of the photometric circuit 10. That is, in step S212 it is determined whether the int that has been set for the next round of photometry is smaller than the minimum value. If the result of step S212 is affirmative, the next round int is set to int_min in step S213. When the result of step S212 is negative, the determination of equation 8 is performed in step S214.

$$int > int\_max \quad (8)$$

Here, int_max is the maximum accumulation time of the photometric circuit 10. That is, in step S214 it is determined whether the value of int set for the next round is greater than the maximum value. When the result of step S214 is affirmative, the next round int is set to int_max in step S215.

The typical values of each parameter in the above processing are shown below.

$$int\_min = 10\ \mu S \quad (9)$$

$$int\_max = 100\ mS \quad (10)$$

$$intx0 = 80\ mS \quad (11)$$

$$intn0 = 10\ mS \quad (12)$$

$$intx1 = 40\ mS \quad (13)$$

$$intn1 = 5\ mS \quad (14)$$

$$VL = 4 \quad (15)$$

Figure 11:
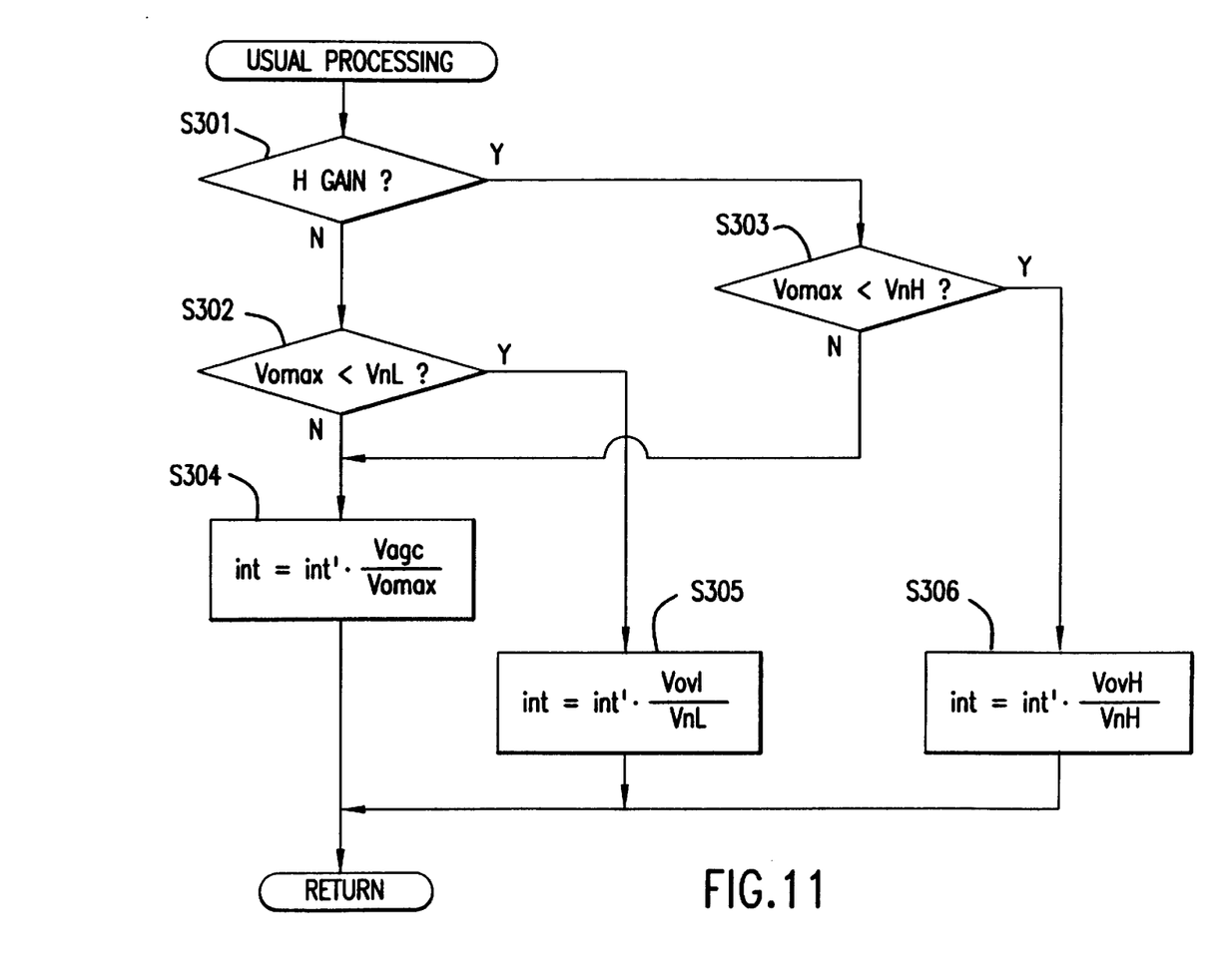
FIG. 11 is a flow chart showing a process for setting the accumulation time when an overflow condition did not occur in the photometric device according to the preferred embodiment.

FIG. 11 is a flow chart of a subroutine for computing the next round accumulation time in the usual accumulation time processing. This subroutine is called and executed when step S203 of FIG. 9 is executed. First, it is determined in step S301 whether the gain of the photometric circuit 10 is H. If the gain was L, it is determined in step S302 whether Vomax is less than VnL, with flow advancing to step S305 if the result of step S302 is affirmative, and to step S304 if negative. Here, VnL is the noise level of the photometric output in the case of L gain. If Vomax is at or below VnL, it indicates that all the photometric outputs were at or below the noise level.

In step S301, if the gain was H, it is determined in step S303 whether Vomax is smaller than VnH, with flow advancing to step S306 if the result of step S303 is affirmative, and to step S304 if negative. Here, VnH is the noise level of the photometric output in the case of H gain. If Vomax is at or below VnH as with VnL, it indicates that all the photometric outputs were at or below the noise level.

In step S304, the next round accumulation time when Vomax was greater than the noise level is computed using the equation 16 shown below:

$$int = int' \cdot Vagc/Vomax \quad (16)$$

Here, Vagc indicates the target level of Vomax of the photometric data in the next round of photometry, and is set to a somewhat lower value than the saturated output voltage of the photometric circuit 10. The standard values are saturated output voltage=3.4V and Vagc=3V. Also, int' is the accumulation time of the previous round of photometry.

In step S305, the next round accumulation time int is set when Vomax was at or below the noise level during L gain, and is computed using the equation 17 below:

$$int = int' \cdot VovL/VnL \quad (17)$$

Here, VovL is the saturated output voltage at L gain; its standard value is about 3.4V as described above, and the standard value of VnL is about 40 mV.

In step S306, the next round accumulation time int is set when Vomax was at or below the noise level during H gain, and is computed using the equation 18 below:

$$int = int' \cdot VovH/VnH \quad (18)$$

Here, VovH is the saturated output voltage at H gain; its standard value is about 3.4V as described above, and the standard value of VnH is about 160 mV.

Figure 12:
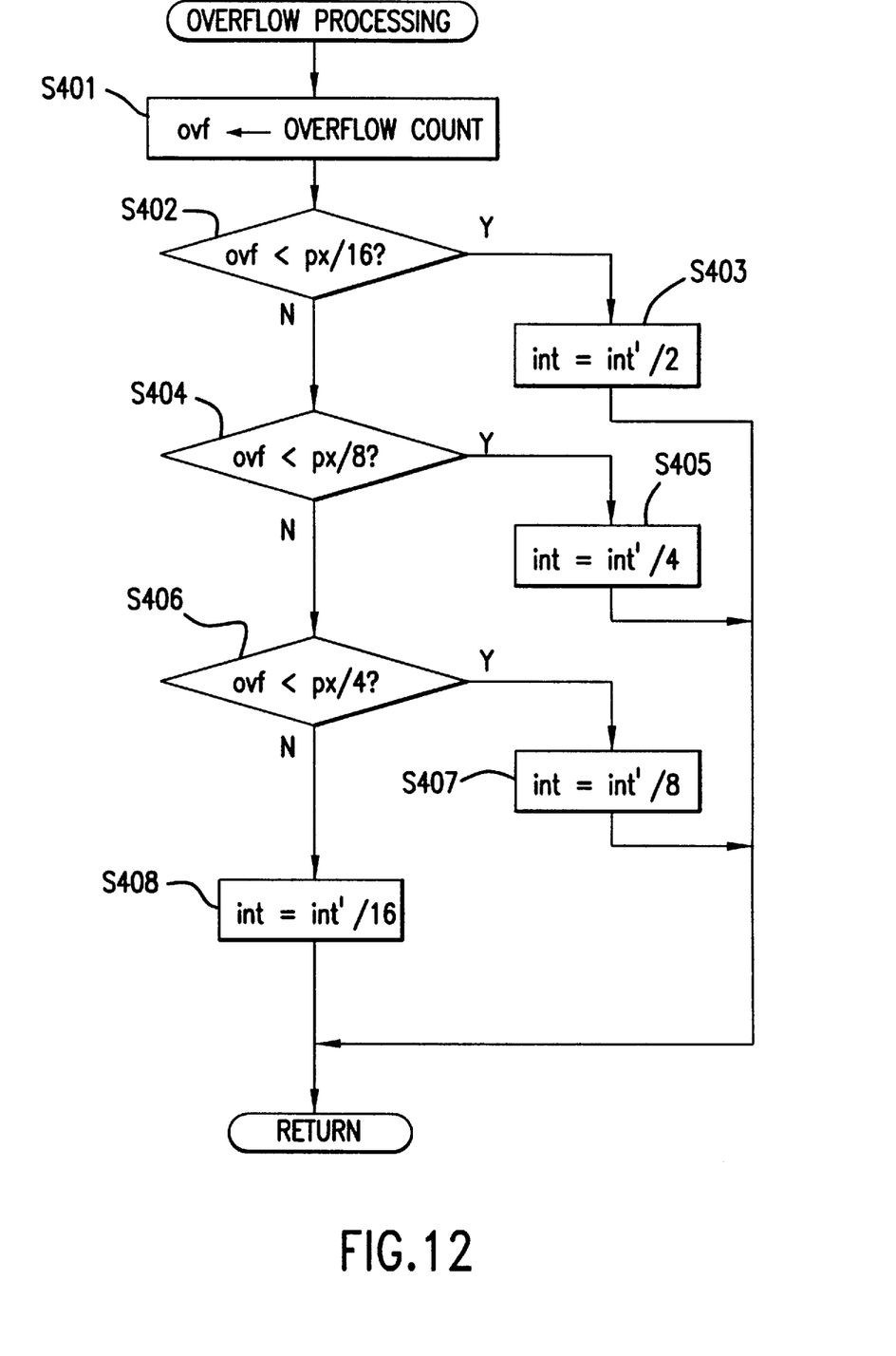
FIG. 12 is a flow chart showing a process for setting the accumulation time when an overflow condition occurred in the photometric device according to the preferred embodiment.

FIG. 12 is a flow chart of the subroutine for setting the next round accumulation time int when the Vomax of the photometric output of the previous round has overflowed. This subroutine is called and executed when the step S204 of FIG. 9 is executed. First, in step S401, the number of overflowed regions among the 240 photometric regions is determined. In other words, it is determined how many areas of the output are at or above VovL if the gain was L, or at or above VovH if the gain was H. The resulting value is assigned to the variable ovf.

Next, it is determined in step S402 whether ovf is less than px/16. Here, px is the number of photometric regions, and in this case, px=240. If the result of step S402 is affirmative, flow advances to step S403, where int is made int'/2, that is, ½ the value of the previous round. If the result of step S403 is negative, it is determined in step S404 whether ovf is less than px/8, and if so, in step S405, int is set to int'/4, that is, to ¼ the value of the previous round. If the result of step S404 is negative, it is further determined in step S406 whether ovf is less than px/4, and if so, in step S407, int is set to int'/8, that is, ⅛ the value of the previous round. If the result of step S406 is also negative, it ends with int=int'/16, that is, ¹⁄₁₆ the value of the previous round.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A photometry device comprising:
   a photometric circuit that performs photometry on an object field using an accumulating photometric element;
   an abnormality sensor that determines whether an output of the photometric circuit is normal or abnormal, the abnormality sensor determining that an abnormality has occurred when an inversion, which is a drop in the photometric circuit output below an overflow condition after the photometric circuit output has first reached the overflow condition, has occurred; and
   a controller that controls the accumulation of charge by the photometric element of the photometric circuit, the controller performing the control according to a first process when the abnormality sensor determines that the photometric circuit output is abnormal, the first process differing from a second process that is used by the controller when the abnormality sensor determines that the photometric circuit output is normal.

2. The device of claim 1, wherein the photometric element includes optically blocked photoelectric converter elements that produce a light-blocked pixel output, and the abnormality sensor determines whether the inversion has occurred in the photometric circuit output based on a value of the light-blocked pixel output.

3. The device of claim 2, wherein the abnormality sensor determines whether the inversion has occurred in the photometric circuit output by comparing the value of the light-blocked pixel output to an overflow reference value of the photometric circuit.

4. The device of claim 3, wherein the overflow reference value of the photometric circuit represents a maximum output value of the photometric circuit for which the output is linear.

5. The device of claim 1, wherein the controller sets an accumulation time that is to be used by the photometric element to perform photometry during a subsequent round of photometry to a predetermined value when the abnormality sensor determines that the photometric circuit output is abnormal.

6. The device of claim 1, wherein the controller sets an accumulation time that is to be used by the photometric element to perform photometry during a subsequent round of photometry to a minimum value when the abnormality sensor determines that the photometric circuit output is abnormal.

7. The device of claim 1, wherein a gain of the photometric circuit can be switched between at least a high gain state and a low gain state, and the controller sets the gain to the low gain state when the abnormality sensor determines that the photometric circuit output is abnormal.

8. The device of claim 1, wherein the photometric element includes a reference output that outputs a fixed output value that is not dependent on accumulation time, and the abnormality sensor determines whether the photometric circuit output is normal or abnormal based on the reference output.

9. The device of claim 8, wherein the abnormality sensor also determines whether the photometric circuit output is normal or abnormal based on a value of the photometric output.

10. The device of claim 1, wherein a gain of the photometric circuit can be switched between at least a high gain state and a low gain state, and the controller sets the gain to a predetermined gain state and sets an accumulation time that is to be used by the photometric element to perform photometry during a subsequent round of photometry to a predetermined value when the abnormality sensor determines that the photometric circuit output is abnormal.

11. The device of claim 10, wherein the predetermined state is the low gain state and the predetermined value is a minimum value of the accumulation time.

12. A photometry device comprising:
    a photometric circuit that performs photometry on an object field using an accumulating photometric element;
    an abnormality sensor that determines whether an inversion has occurred in an output of the photometric circuit by determining whether the photometric circuit output has dropped below an overflow condition after the photometric circuit output has first reached the overflow condition; and
    a controller that controls the accumulation of charge by the photometric element of the photometric circuit based on whether the abnormality sensor determines that the inversion has occurred in the photometric circuit output.

13. The device of claim 12, wherein the photometric element includes optically blocked photoelectric converter elements that produce a light-blocked pixel output, and the abnormality sensor determines whether the inversion has occurred in the photometric circuit output based on a value of the light-blocked pixel output.

14. The device of claim 13, wherein the abnormality sensor determines whether the inversion has occurred in the photometric circuit output by comparing the value of the light-blocked pixel output to an overflow reference value of the photometric circuit.

15. The device of claim 14, wherein the overflow reference value of the photometric circuit represents a maximum output value of the photometric circuit for which the output is linear.

16. A photometry device comprising:
    photometric means for performing photometry on an object field based on an amount of charge that is accumulated due to exposure by light from the object field with the passage of time;
    abnormality sensing means for determining whether an output of the photometric means is normal or abnormal, the abnormality sensing means determining that an abnormality has occurred when an inversion, which is a drop in the photometric means output below an overflow condition after the photometric means output has first reached the overflow condition, has occurred; and control means for controlling the accumulation of charge by the photometric means according to a first process when the abnormality sensing means determines that the output of the photometric means is abnormal, and according to a second process differing from the first process when the abnormality sensing means determines that the output of the photometric means is normal.

17. The device of claim 16, wherein the control means sets an accumulation time that is to be used by the photometric means to perform photometry during a subsequent round of photometry to a predetermined value when the abnormality sensing means determines that the output of the photometric means is abnormal.

18. The device of claim 16, wherein a gain of the photometric means can be switched between at least a high gain state and a low gain state, and the control means sets the gain to the low gain state when the abnormality sensing means determines that the output of the photometric means is abnormal.

19. The device of claim 16, wherein the photometric means produces a light-blocked pixel output, and the abnormality sensing means determines whether the output of the photometric means is normal or abnormal based on a value of the light-blocked pixel output.

20. A method of controlling photometry comprising the steps of:

performing photometry on an object field using a photometric circuit that accumulates charge with the passage of time;

determining whether an output of the photometric circuit during the photometry was normal or abnormal, the output of the photometric circuit being determined to be abnormal when the output of the photometric circuit drops below an overflow condition after the output of the photometric circuit has first reached the overflow condition; and controlling the accumulation of charge by the photometric circuit during a subsequent round of photometry according to a first process when the photometric circuit output is determined to be abnormal, and controlling the accumulation of charge by the photometric circuit during the subsequent round of photometry according to a second process when the photometric circuit output is determined to be normal, the second process differing from the first process.

21. The method of claim 20, wherein the first process sets an accumulation time that is to be used by the photometric circuit to perform photometry during the subsequent round of photometry to a predetermined value when the photometric circuit output is determined to be abnormal.

22. The method of claim 20, wherein a gain of the photometric circuit can be switched between at least a high gain state and a low gain state, and the first process sets the gain to the low gain state when it is determined that the photometric circuit output is abnormal.

23. The method of claim 20, wherein the photometric circuit produces a light-blocked pixel output, and the photometric circuit output is determined to be normal or abnormal based on a value of the light-blocked pixel output.

24. The method of claim 20, wherein a gain of the photometric circuit can be switched between at least a high gain state and a low gain state, and the first process sets the gain to a predetermined gain state and sets an accumulation time that is to be used by the photometric circuit to perform photometry during the subsequent round of photometry to a predetermined value when it is determined that the photometric circuit output is abnormal.

* * * * *